INVENTOR.
Alexander C. Russell.
By William C. Linton
Atty.

Patented Jan. 3, 1933

1,893,446

UNITED STATES PATENT OFFICE

ALEXANDER CUNNINGHAM RUSSELL, OF CATHCART, SCOTLAND, ASSIGNOR TO G. & J. WEIR, LIMITED, OF GLASGOW, SCOTLAND

VALVE FOR STEAM ENGINES

Application filed June 18, 1928, Serial No. 286,460, and in Great Britain July 14, 1927.

The present invention relates to valves for steam engines, and more particularly to valves intended for use in distributing steam to the steam cylinders of direct-acting steam-driven pumps.

The present invention provides a valve arrangement which includes a steam chest, a main valve, and an auxiliary valve. The main valve is moved for part of its travel by the piston of the steam engine and is then quickly thrown over to the end of its travel by the action of steam admitted to act on one of its ends. During the piston-actuated portion of its motion, the main valve acts to cut off steam from the engine cylinder.

The invention consists in a valve arrangement for the purpose specified comprising a chest having a port at each end and a ring of supply ports between its ends, said ring of supply ports being surrounded by an annular steam supply chamber, and intermediate and end rings of ports arranged on both sides of the ring of supply ports, said intermediate rings of ports having connections with the ends of the engine cylinder, the end rings of ports communicating with exhaust connections, there being movable endwise of the chest a piston main valve formed with three annular ports of which the middle port is adapted to establish communication between the ring of supply ports and either one of the intermediate rings of ports, and each end annular port is adapted to establish communication between one of the intermediate rings of ports and one of the end rings of ports, there being arranged to extend axially through the main valve a spindle having a lost motion connection with the main valve and having a lost motion connection with the engine piston, an auxiliary valve controlling passages connected to the ports at each end of the chest and passages connected respectively to the steam supply chamber and exhaust connections, said auxiliary valve admitting steam to, and exhausting it from, the ends of the chest when the main valve reaches cut-off position and having a lost motion connection with the engine cylinder.

The invention will be made clear by the following illustrative description and will be defined in the annexed claim.

Figure 1:
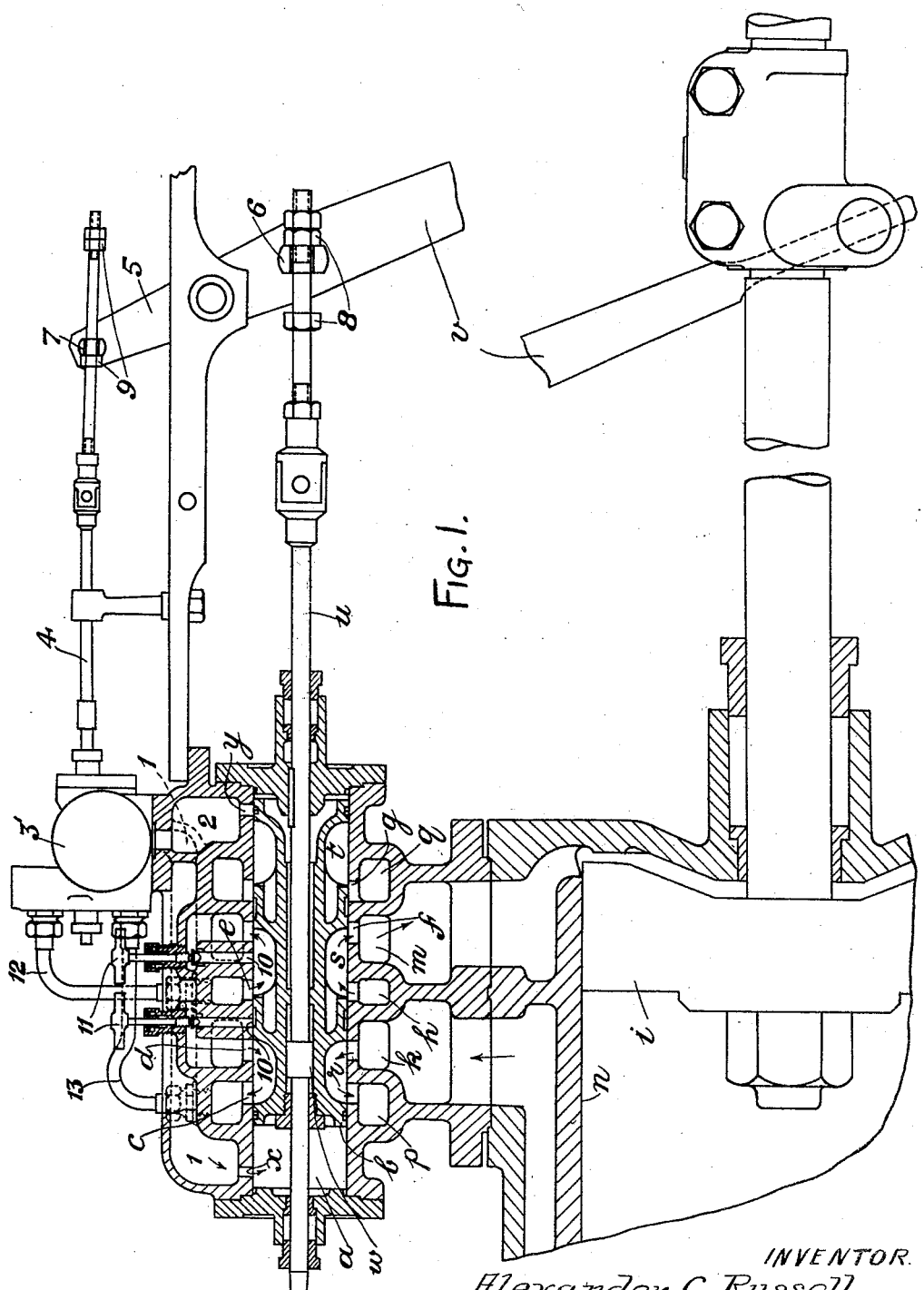
Figure 2:
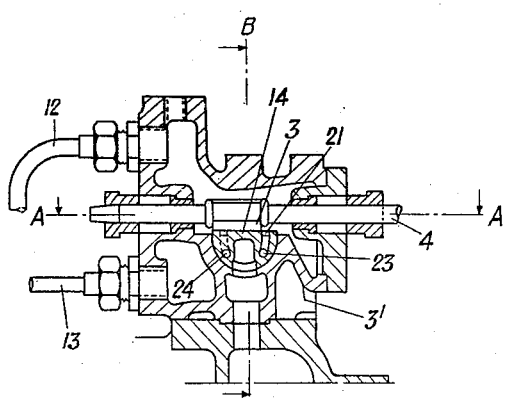
Figure 4:
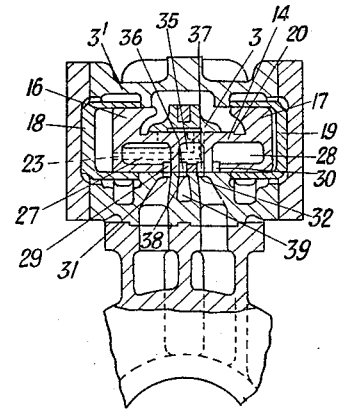
Figure 3:
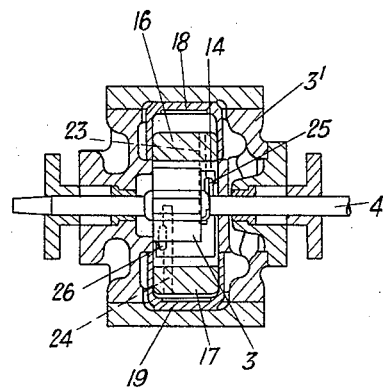
Figure 5:
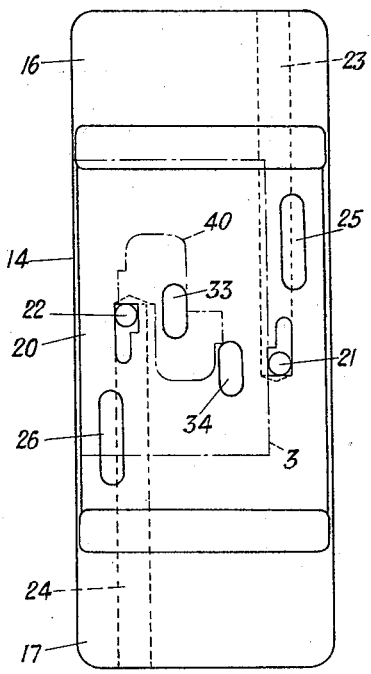

In the accompanying drawings Fig. 1 is an axial section of a valve device according to this invention, applied to a reciprocating steam engine. Figs. 2 and 3 are sections at right angles to one another of the auxiliary valve device shown diagrammatically in Fig. 1, Fig. 3 being a section on the line A—A of Fig. 2. Fig. 4 is a section on the line B—B of Fig. 2. Fig. 5 is an elevation drawn to a larger scale showing the shuttle valve of the auxiliary valve device.

The main valve is (in the present example) formed as a piston-valve $b$. It reciprocates in the cylinder $a$ which is provided with five rings of ports $c$, $d$, $e$, $f$, and $g$.

The ring of ports $e$ is situated midway between the ends of the cylinder $a$, and the ports $e$ communicate with an annular steam passage $h$ which is connected to the main steam inlet (not shown).

The rings of ports $d$ and $f$ are equidistant from, and on opposite sides of, the ring of ports $e$. The ports $d$ and $f$ communicate with the annular passages $k$ and $m$ respectively, these passages, in their turn, communicating with the ends of the steam cylinder $n$ of the pump, in which cylinder the piston $i$ reciprocates.

The rings of ports $c$ and $g$ are also equidistant from the ring of ports $e$ and spaced from, and on the sides adjacent to the cylinder ends of, the rings of ports $d$ and $f$ respectively. They communicate with the passages $p$ and $q$ respectively, which in turn communicate with the exhaust branch (not shown).

The piston-valve $b$ is provided with three annular grooves $r$, $s$, and $t$, which are adapted to act as connecting passages between the rings of ports for the admitting or exhausting of steam to or from the steam cylinder $n$.

The piston-valve $b$ is mounted on a spindle $u$ which passes through the valve and is reciprocated by a lever $v$ connected at its end to the piston-rod of the main piston $i$. The piston valve $b$ is not rigidly secured to the spindle $u$, however, but floats thereon. The spindle $u$ is provided with an enlarged portion $w$, which is adapted to abut against the ends of an enlarged part of the bore of the valve, thereby enabling the spindle to move the valve.

Ports $x$ and $y$ are provided in the cylinder $a$—one at, and spaced a short distance from, each end. These ports communicate, by means of passages 1 and 2 respectively, with an auxiliary valve device housed within a chest $3'$, the function of which valve device is to simultaneously put the port $x$ into communication with exhaust and the port $y$ into communication with the supply of live steam, or vice versa, for the purpose of suddenly moving the valve $b$ in the manner described below with reference to the operation of the device. The auxiliary valve 3 is of the known form described in British patent specifications Nos. 1028 of 1881 and 3723 of 1894. The auxiliary valve device is connected to the live and exhaust steam passages by the pipes 12 and 13. The auxiliary valve device is operated by a spindle 4 which is moved by an upward extension 5 of the lever $v$ used to operate the piston-valve $b$. The spindle $u$ of the piston-valve $b$ and the spindle 4 of the valve 3 pass freely through cross-heads 6 and 7 on the lever and its extension 5 respectively, and are only moved when the respective cross-head comes into contact with either member of one of the pairs of stops 8 and 9 respectively, the distance apart of which is adjustable.

The valve chest $3'$ houses two valves, namely, a cylindrical shuttle valve 14 slidable transversely of the spindle 4 and a co-operating flat auxiliary valve 3 secured on the spindle 4. The shuttle valve 14 has opposed piston-forming end portions 16, 17 operating in opposed chambers 18, 19, respectively, fitted within the valve chest $3'$ and an intermediate semi-cylindrical portion presenting a flat ported valve face 20 traversible by the valve 3. Ports 21, 22 in the face 20 are connected to the chambers 18, 19 by way of passages 23, 24, respectively, formed internally in the valve 14. Ports 25, 26 in the face 20 are steam ports through which steam is admitted, under the control of the valve 3, to the passages 1, 2 respectively, said ports 25, 26 opening into chambers 27, 28 within the valve 14, said chambers having ports 29, 30 adapted to cooperate with fixed ports 31, 32 in the valve chest $3'$, said fixed ports communicating with the passages 1, 2 respectively. 33, 34 denote exhaust ports in the face 20 opening into a chamber 35 within the valve 14, said chamber 35 having ports 36, 37 adapted to cooperate with a fixed port 38 open to an exhaust passage 39. Steam is admitted to the space above the valves 14, 3 within the chest $3'$ by way of the pipe 12 connecting the chest $3'$ with the steam passage $h$. Exhaust is taken from the passage 39 by way of the pipe 13 to the exhaust passage $p$.

The operative face of the valve 3 is relieved as indicated in chain-dotted lines at 40 (Fig. 5).

In the operation of the auxiliary valve device with the piston $i$ and valve $b$ at the bottom end of their stroke, i. e., as shown in Fig. 1, the valves 3 and 14 are disposed as shown in Figs. 2–5, the valve 3 being at the top of its stroke and the valve 14 being located to the right-hand side of its travel as viewed in Fig. 4. In such relative position of the valves 3, 14 the end 16 of the valve 14 is exposed to live steam by way of the port 21 and passage 23, the port 21 being unmasked by the valve 3 together with the port 25 through which latter live steam is admitted to the top end of the valve $b$ by way of the chamber 27, registering ports 29, 31, passage 1 and port $x$, the bottom end of the valve $b$ having been connected to exhaust by way of the port $g$, passage 2, ports 32, 37, chamber 35, ports 36, 38, passage 39, pipe 13 and passage $p$.

Towards the end of the upward stroke of the piston $i$, when the valve 3 is displaced to the bottom end of its stroke, the valve 14 is shot over to the left-hand side of its travel as viewed in Fig. 4, when the end 17 is exposed to live steam by way of the port 22 and passage 24 on unmasking of the port 22 by the valve 3. The port 25 is masked and the port 26 is unmasked by the valve 3 so that, while the top end of the valve $b$ is connected to exhaust by way of $x$, 1, 31, 36, 35, 37, 38, 39, 13, $p$, live steam is admitted to the bottom end of the valve $b$ by way of 26, 28, 30, 32, 2, $y$, so that the valve $b$ is shot forwardly on its spindle $u$. In the travel of the valve 3 from the top to the bottom end of its stroke the ports 21, 34 are interconnected by way of the recess 40 in the face of the valve 3, so that, when the valve 14 is shot towards the left of Fig. 4, the chamber 18 is opened to exhaust by way of 23, 21, 40, 34, 35, 37, 38, 39, 13, $p$, the port 34 being masked by the valve 3 in the final movement of the valve 14 towards the left of Fig. 4. The actuation of the valve 14 in the reverse direction is similar, the ports 22, 33 being interconnected to permit exhaust from the chamber 19. A certain amount of exhaust cushioning steam is trapped in turn in each of the chambers 18, 19 at each stroke of the valve 14 so as to prevent shock in working.

A port 10 is provided between each of the rings of ports $d$ and $f$ and the ring of ports $e$. Each port 10 communicates with the nearer of the passages $k$ and $m$ leading to the opposite ends of the steam cylinder $n$. Hand-operated valves 11 are provided for controlling the amount of steam passing through these ports 10. The ports 10 act as by-passes and serve to allow of the passage of a certain quantity of steam from the ports $e$ to one or other of the passages $k$ and $m$ for a certain time after the valve $b$ has cut off communication between the ports $e$ and the ports $d$ or $f$.

The operation of the engine will now be described.

Assume the parts at starting to be in the positions shown in the drawings, i. e. with the main piston $i$ and the piston-valve $b$ at the bottoms of their strokes. The auxiliary valve 3 is in the left hand position and the shuttle valve 14 associated with said valve 3 is in the bottom position (Figs. 2, 3 and 4). The bottom of the cylinder $n$ is open to live steam by way of the passage $m$, ring of ports $f$, piston-valve passage $s$, and ring of steam ports $e$. The top of this cylinder is open to exhaust by way of the passage $k$, ring of ports $d$, piston-valve passage $r$, and ring of exhaust ports $c$.

The upper end of the cylinder $a$ is open to live steam by way of the port $x$ and passage 1, auxiliary valve chest 15 and port 16, the lower end having been exhausted by way of port $y$ and passage 2.

The piston in the cylinder $n$ now commences to move from the bottom to the top of the cylinder, due to the admission of steam. The piston-valve $b$, however, does not move (against the steam-pressure in the upper end of cylinder $a$) until the cross-head 6 comes into contact with the upper of the pair of stops 8, and the enlargement $w$ of the piston-valve spindle $u$ abuts against the upper end of the enlargement in the piston-valve bore. The valves remain stationary until the engine piston $i$ reaches about half stroke. The piston valve $b$ then begins to move in the same direction as the engine piston $i$ by the action of mechanical connections $v$, 6, 8, $u$ against the steam pressure on the top of the piston valve $b$.

At about three-quarters stroke the piston valve $b$ closes the port $f$ leading to the bottom of the cylinder, and the remainder of the stroke is completed by the expansion of the steam or by more steam admitted through the by-pass 10.

When the piston $i$ is at the top of its stroke, the auxiliary valve 3, which is actuated similarly to the piston valve $b$, is now in the bottom position and opens the port 17 leading to the right hand end of the shuttle valve 14 to exhaust. The other end is open to steam pressure through the port 18, and the shuttle valve 14 is thrown over until the exhaust steam from the right hand end of the shuttle valve is cut off, this exhaust steam acting as a cushion and preventing the shuttle valve from hitting the end cover. The shuttle valve 14 is now at the end of its travel, and the port 1, which admitted steam to the top of the piston valve $b$ through the port $x$, is now open to exhaust through the port 19 and thence to the common port $q$. The arrangement is such that the piston-valve commences to move at about half-stroke, and cut-off takes place at about three-quarters stroke. If we neglect, for the time being, the action of the by-pass ports 10, the remainder of the stroke is completed by the expansion of the steam in the cylinder $n$. When the end of the stroke of the main piston $i$ is reached, the cross-head 7 abuts against the lower of the stops 9 and operates the auxiliary valve device to admit live steam through the passage 2 and port $y$ and to connect the passage 1 and port $x$ to exhaust, as hereinbefore described. The piston-valve $b$ is thereupon suddenly thrown to the upper end of the cylinder $a$ sliding like a shuttle on the rod $u$. It is prevented from hitting the end of the cylinder by reason of the fact that, just before it reaches the end of its travel, it closes the port $x$ and entraps a certain quantity of exhaust steam, which steam acts as a cushion.

The upper end of the cylinder $n$ is now open to live steam by way of the passage $k$, ring of ports $d$, piston-valve passage $s$, and ring of steam ports $e$. The bottom of the cylinder is open to exhaust.

The sequence of operations on the down-stroke is the same as that described above with reference to the upstroke.

Under certain conditions, it is necessary to supply a small quantity of steam to the cylinder $n$ after normal cut-off, in order to ensure the completion of the stroke. It is for this purpose that the ports 10 and their passages are provided. One or the other of these admits steam to the cylinder after the ring of ports $d$ or $f$, as the case may be, has been closed by the piston-valve $b$, the steam passing from the passage $h$ through the ports $e$, passage $s$ and port 10 to the passage $k$ or $m$. The amount of steam so admitted is adjusted by the hand-operated valves 11 so as just to cause the completion of the stroke.

Having thus described my invention, what I claim as new and desire to secure by Letters Patent is:—

A valve for distributing steam to an engine cylinder provided with a reciprocating piston, comprising, a chest, having a port at each of its ends, a ring of supply ports positioned between its ends, an annular steam supply chamber surrounding said ring of supply ports, and intermediate and end rings of ports on both sides of said ring of supply ports; connections between said intermediate rings of ports and the ends of the cylinder; exhaust connections communicating with the end rings of ports; a piston main valve movable endwise of said chest; said main valve being formed with three annular ports, the middle annular port being adapted to establish communication between said ring of supply ports and either one of said intermediate rings of ports; and each end annular port being adapted to establish communication between one of the intermediate rings of ports and one of the end rings of ports; a valve spindle extending axially through said main valve and having a lost motion connection with the latter; a lost motion connection between said spindle and the piston; passages connected to the ports at each end of said chest; passages connected respectively to said steam supply chamber and said exhaust connections; an auxiliary valve controlling said passages, admitting steam to and exhausting it from the ends of said chest, when said main valve reaches cut-off position; and, a lost motion connection between said auxiliary valve and piston.

I hereby sign my name to this specification.

ALEXANDER CUNNINGHAM RUSSELL.